D. J. ESSER.
CULINARY VESSEL.
No. 177,703.  Patented May 23, 1876.
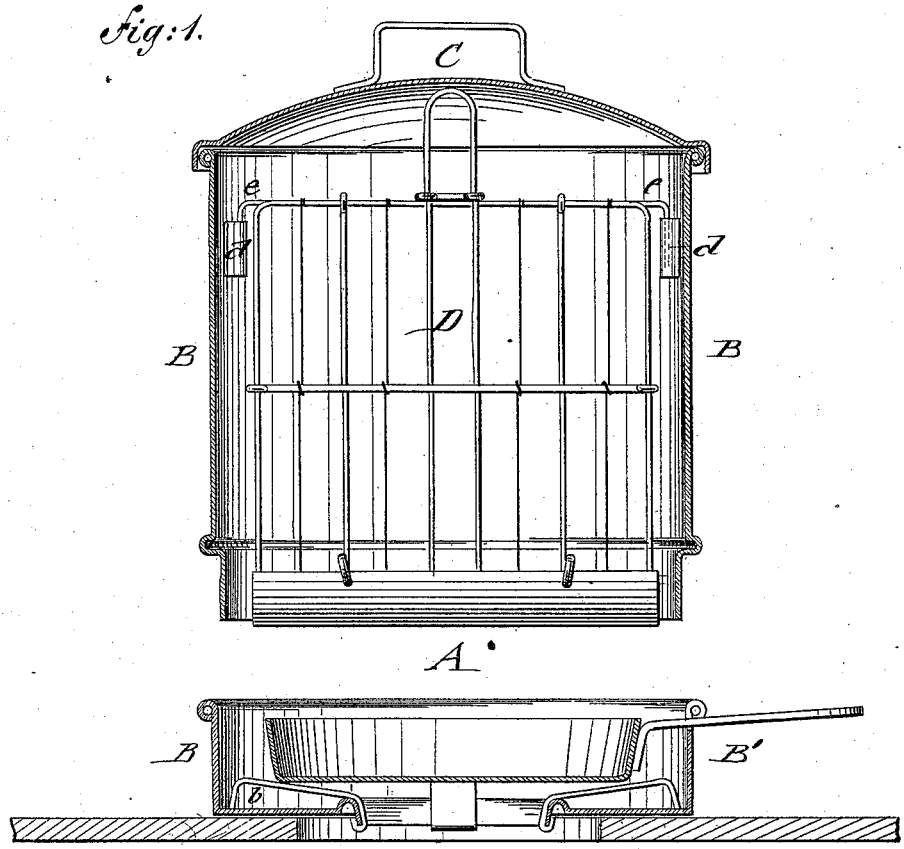
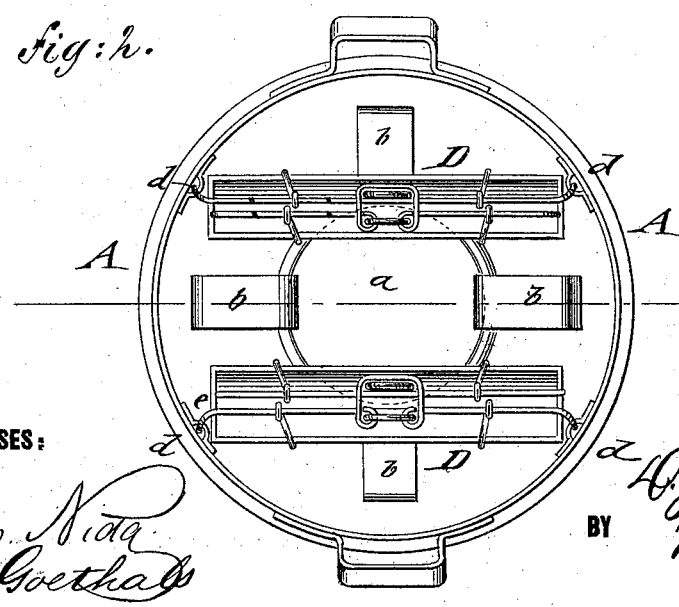
WITNESSES:
Chas. Nida
John Goethals
INVENTOR:
D. J. Esser
BY
Munn
ATTORNEYS.

UNITED STATES PATENT OFFICE.

DANIEL J. ESSER, OF MAUCH CHUNK, PENNSYLVANIA.

IMPROVEMENT IN CULINARY VESSELS.

Specification forming part of Letters Patent No. 177,703, dated May 23, 1876; application filed March 6, 1876.

*To all whom it may concern:*

Be it known that I, DANIEL J. ESSER, of Mauch Chunk, in the county of Carbon and State of Pennsylvania, have invented a new and Improved Culinary Vessel, of which the following is a specification:

In the accompanying drawing, Figure 1 represents a vertical central section of my improved culinary vessel, and Fig. 2 a top view of the same with cover detached.

Similar letters of reference indicate corresponding parts.

My invention relates to an improved culinary vessel that is adapted to cook with pans and pots of larger and smaller size in a perfectly odorless and inoffensive manner; and the invention consists of sectional vessel with central bottom opening, closed top, and bottom supports, adapted to place different sizes of cooking vessels and broilers within the same.

In the drawing, A represents my improved culinary vessel for producing the cooking operations in a perfectly odorless manner. The vessel A is made of such size that larger and smaller pans, and larger and smaller pots, may be placed in the same, so as to adapt it for nearly all cooking operations. For the purpose of admitting the easier handling of the vessel A, it is made preferably of a smaller bottom section, B', for the pans, and a top section, B, of greater height for the pots.

The vessel may, however, if desired, be made of more than two sections, if it should be found more convenient for placing middle-sized pots into the same. The lowermost section of the vessel has a central opening, $a$, of sufficient size to admit the free action of the fire on the inside pan or pot, and suitable supports or rests $b$, for the pots to be placed upon. The cover C fits all the sections to close the same tightly, and produce the drawing off of all odors produced in cooking through the bottom opening by the draft caused by the fire. The upper section B of the vessel A is further provided with eyes or sockets $d$, to which one or more broilers, D, with suspension-hooks $e$, may be hung to admit the use of the vessel for broiling purposes.

The broilers may be made of octagonal shape, to admit the use of the same in horizontal position in the lower section. The broilers have to be provided with bottom troughs for collecting the drippings of the meat.

The convenience of the sectional vessel consists in its adaptation to the different sizes of vessels used in cooking and to broilers, so that it is not confined to pans merely, but may be used for cooking and broiling without smoke and stench.

I am aware that culinary vessels adapted to cook with pans in odorless manner have been patented heretofore, and I therefore lay no claim to the same.

Having thus described my invention, I claim as new and desire to secure by Letters Patent—

The combination of upper section B, having cover C, with lower section B', having central opening $a$ and rests $b$, as and for the purpose specified.

DANIEL J. ESSER.

Witnesses:
 T. B. MOSHER,
 ALEX. F. ROBERTS.